(12) United States Patent
McGee

(10) Patent No.: US 7,657,462 B2
(45) Date of Patent: Feb. 2, 2010

(54) SMART MULTI-SEARCH METHOD

(75) Inventor: Todd McGee, Delray Beach, FL (US)

(73) Assignee: netcomponents, Inc., Delray Beach, FL (US)

( * ) Notice: Subject to any disclaimer, the term of this patent is extended or adjusted under 35 U.S.C. 154(b) by 0 days.

(21) Appl. No.: 12/316,045

(22) Filed: Dec. 9, 2008

(65) Prior Publication Data
US 2009/0138371 A1    May 28, 2009

Related U.S. Application Data

(62) Division of application No. 10/059,559, filed on Jan. 29, 2002, now Pat. No. 7,480,628.

(51) Int. Cl.
*G06Q 30/00*   (2006.01)
(52) U.S. Cl. .............................. 705/26; 707/3
(58) Field of Classification Search ........................ None
See application file for complete search history.

(56) References Cited

U.S. PATENT DOCUMENTS 6,850,900 B1 *   2/2005   Hare et al. .................. 705/26

* cited by examiner

*Primary Examiner*—F. Zeender
*Assistant Examiner*—Luna Champagne
(74) *Attorney, Agent, or Firm*—Greenberg Traurig, P.A.

(57) ABSTRACT

The present invention is a method for providing, in response to a single search multiple product/service item query, search results for multiple products/services that are grouped and ranked by supplier based on which supplier(s) have inventory with respect to the greatest number of the queried products/services. The user can identify which vendor can best fill the entire order, simplifying the buying process. A single query can be entered by a user covering their entire required bill of materials list. The method is preferably implemented via a website server using known methods of Internet communication. The search results can be customized further to categorize suppliers by geographic location, supplier type, pricing or other criteria.

5 Claims, 4 Drawing Sheets

SMART MULTI-SEARCH METHOD

CONTINUITY INFORMATION

This application is a divisional application of U.S. non-provisional patent application Ser. No. 10/059,559 filed on Jan. 29, 2002 now U.S. Pat. No. 7,480,628. The benefit under 35 U.S.C. §120 and 35 U.S.C. §121 is hereby claimed based on said application.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to a method and system for complex-query searching of databases. More specifically, the present invention relates to a method and system for complex multiple item query searching of databases whereby search results are grouped and ranked by suppliers based on which suppliers have inventory for the greatest number of queried items.

2. Description of Background Art

Buyers in need of goods and services often spend considerable time locating desired goods and services and the appropriate vendors therefor. Buyers typically use trade publications, directories, recommendations, and other means to locate vendors. If the type of vendor needed is in a foreign country, the problem compounds. Vendors advertise through various media and by direct sales methods to make known to potential buyers what they sell and how to contact them. Once a buyer identifies a few vendors, each must be contacted to obtain product or service price and availability information. These processes are costly, require experienced personnel and are time consuming for most businesses.

The market for goods and services in various industries is becoming increasingly global, with orders for such goods or services originating from several countries. It is therefore desirable to provide a quick and efficient way to order products or services through a global network of computers, such as those connected to each other via the Internet. The Internet is a collection of interconnected (public and/or private) networks that are linked together by a set of standard protocols, such as TCP/IP to form a global, distributed network. While this term is intended to refer to what is now commonly known as the Internet, it is also intended to encompass variations which may be made in the future, including changes and additions to existing standard protocols.

Online transactions are fairly cheaper than traditional channels and means of doing business. For example, a bank may charge on average one dollar for each transaction (such as every day transactions, from verifying the balance of a checking or savings account, to withdrawal of money from a local bank), versus an average of seven cents that it costs to do the same transaction on an online bank. For this reason, Internet and online trading is expected to grow significantly.

With the growth of electronic commerce via the Internet, several systems and methods have been developed for searching for and buying desired products and services. For example, U.S. Pat. No. 4,992,940 to Dworkin is directed to a computerized system for ordering products utilizing a product and service information searchable database. The system provides a menu of general product/service categories and upon user selection of an item, provides a template with various technical criteria for the products available. The user enters his or her preferences in the template and the system searches based on the criteria specified, providing the user with a list of products/services matching the specified criteria. The system shows the suppliers of each product appearing in the search results, as well as price.

Other systems are presented in the form of a catalog. For example, U.S. Pat. No. 5,319,542 to King, Jr., et al. is directed to a system for ordering items using an electronic catalog and an electronic requisition facility. The catalog comprises a public catalog for use by all users and a private catalog resident on user computer systems and may contain unique pricing data based on specific pricing agreements between the user and suppliers.

U.S. Pat. No. 5,694,551 to Doyle, et al. is directed to an electronic requisitioning system for channeling customer requisition orders to internal suppliers and outside vendors and processing invoices. Customer multiple item requisition requests are segregated by supplier and sent as purchase orders to appropriate suppliers.

Similarly, U.S. Pat. No. 5,966,697 to Fergerson, et al. is directed to a system and method for secure transaction management. It provides a system and method for shopping at a variety of different vendors, one at a time. U.S. Pat. No. 6,012,053 to Pant, et al. is directed to a computer system for performing searches on a collection of information including a mechanism through which results from a search query are ranked according to user specified relevance factors to allow the user to control how the search results are presented. The relevance factors are applied to the results for each query.

U.S. Pat. No. 6,128,626 to Beauchesne is directed to a method and database system utilized in generating a bill of materials document for a particular user designated customer product. The system responds to part queries by providing part details from approved vendors, including multiple vendors for the same part, and then generates a bill of materials.

Still other efforts include systems that attempt to make query formats for different databases compatible. For example, U.S. Pat. No. 6,233,586 to Chang et al. is directed to a computer method and system capable of searching multiple heterogeneous databases with heterogeneous data types by employing an object oriented data model to define a federated query object, a federated collection object and a federated database object. The system essentially permits searches in multiple databases having different formats.

Similarly, U.S. Pat. No. 6,263,328 to Coden, et al. is directed to a computer system enabling execution of complex database queries using a single query expression against a database without the use of intermediate results sets. Instead, the system uses a flexible and modular architecture to create a graphical user interface and a database-independent representation of a user query that can be used with heterogeneous databases.

Prior art systems and methods for searching for and buying products and services via the Internet fail to address the need for users to have more practical information in order to make multiple product and/or service purchases and to maximize potential savings from discounts obtained by dealing with certain vendors. The present invention addresses these needs and is an improvement over prior art systems and methods. The system and method of the present invention allows users to obtain, through one search query, results for searches of multiple products and services available from multiple vendors with the ability to rank the search results by vendors based on the number of queried products or services available from each.

SUMMARY OF THE INVENTION

The present invention is a searchable product/service database software system enabling complex multiple product/service item query searching of databases, providing, from a single search query, search results for multiple products and services that are grouped and ranked by product/service supplier. For example, in a database containing product inventory data for multiple suppliers, the system allows a user to search for availability of multiple products in one search query, and the search results will be grouped by supplier, showing which supplier(s) have inventory with respect to the greatest number of the desired products. The user can identify which vendor can best fill the entire order, simplifying the buying process. A single query can be entered by a user covering their entire required bill of materials list.

The system is preferably implemented via an Internet website server using known methods of Internet communication. It can be integrated into e-commerce systems in various fields where such functionality would be useful. The search results can be customized further to categorize suppliers by geographic location, pricing or other criteria.

The system of the invention is implemented via a computer system that communicates information over a network, such as the Internet. The computer system is programmed to run all necessary software, such as search and database applications or search and data-mining applications, for achieving the purpose of the invention.

The system of the present invention can be integrated into a system that processes requests for quotation for goods and/or services through one or more central processing units, said system comprising operating system software for controlling said one or more central processing units and storage means containing one or more databases with appropriate identity and other information about members of the network and the goods and services available, one or more servers providing for Internet-based access and use of the system by suppliers to upload their inventory data, request for quotation filtering conditions and means for responding to requests for quotations means for buyers to search the system's supplier and product/service databases and submit requests for quotation, means for said system's central processing unit to transmit requests for quotation to selected system supplier members, means for said supplier members to transmit quotations to the requesting potential buyers in response to their requests for same.

DESCRIPTION OF A PREFERRED EMBODIMENT

Figure 1:
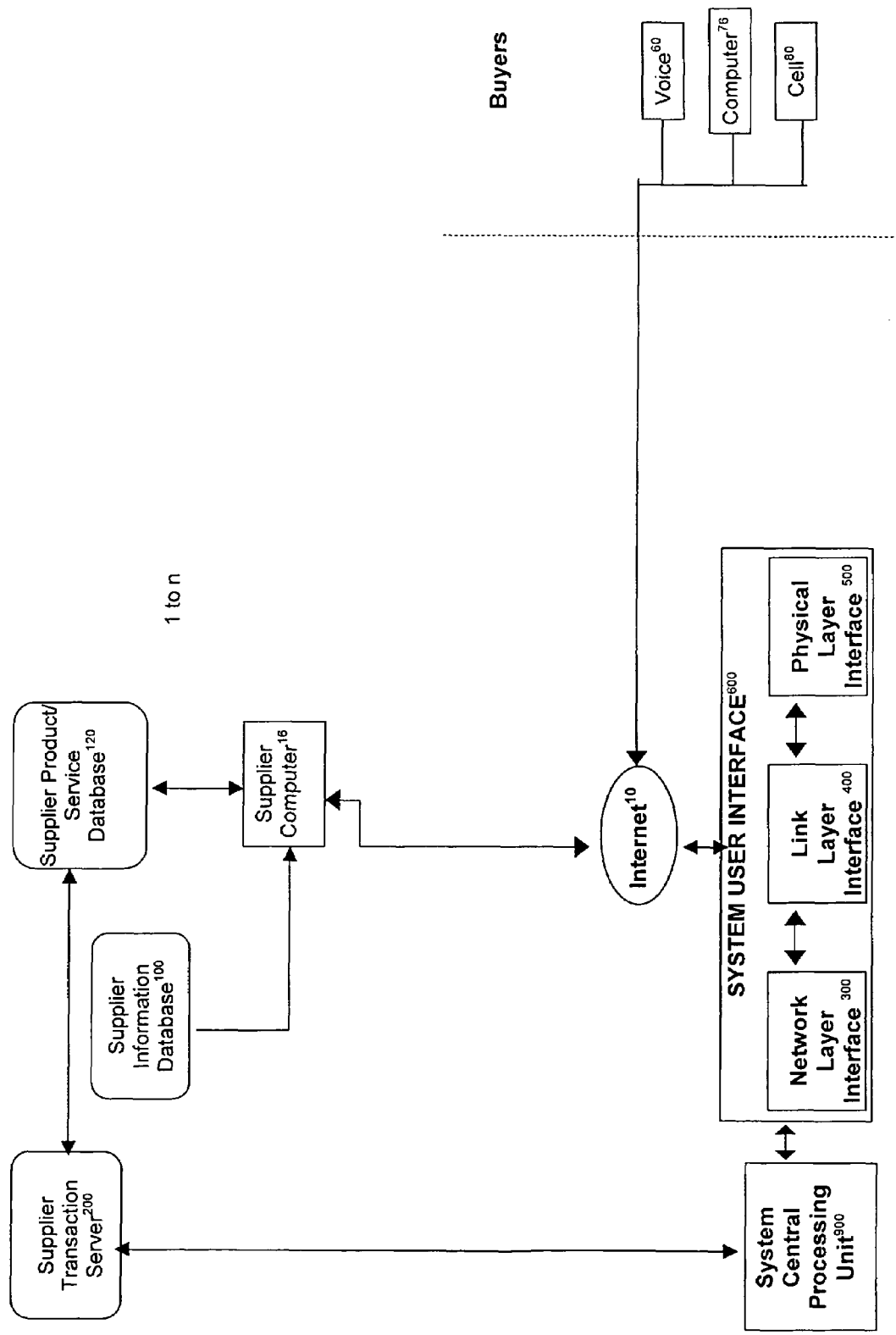
FIG. 1 is a diagram of the system components of the present invention in one embodiment.

FIG. 1 is a diagram of the elements of the system that implements the present invention in one embodiment. Communication between buyers, suppliers and the system computer(s) is effectuated using the Internet. A world wide web home page is set up to provide internet access to the system for members. A potential buyer or supplier user accesses the Internet using any standard web browser and becomes a member network user by completing a registration application providing necessary data about itself. Once registered, a member can access the system's search screen, results screen, and forms necessary for preparing an RFQ. The RFQ is sent through the system by the system server.

As shown in FIG. 1, a supplier information database 100 is connected through a server 200 to a network, such as the Internet 10. In this way, the Internet provides buyers with access to the suppliers via the system. Suppliers provide their product/service inventory database information to the system via the Internet 10 using computer terminals. A buyer interfaces with the system via a user interface 600, such as one that is developed using a well-known markup language protocol, e.g., HTML.

Figure 2:
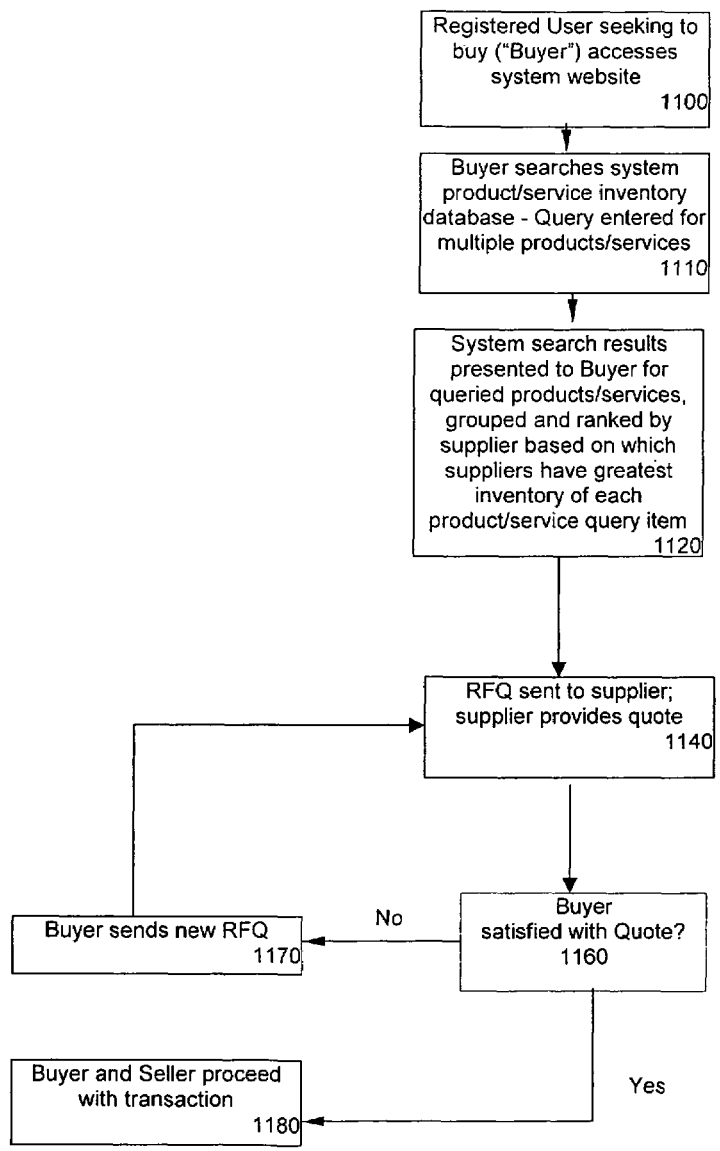
FIG. 2 is a flow chart showing the overall process flow of the method of the present invention in one embodiment.

Referring now to FIG. 2, which is a flow diagram showing the overall process flow of the method of the present invention in a preferred embodiment, the method of the present invention begins when registered buyers interact with the system by accessing the system website 1100 and the supplier information database provided therein to search for desired items. Users can enter a single search query for multiple products and services 1110. The system responds to the user query by providing a list of product/service results grouped and ranked by supplier based on which suppliers have inventory with respect to the greatest number of queried products/services 1120. Ranking is based on the aggregate results of a series of individual part searches for each part specified in the query with suppliers having the most matches receiving the highest ranking.

The buyer can then select the supplier name to retrieve supplier contact information, and contact them directly to request a quotation, or "RFQ," using traditional methods such as telephone, fax, e-mail RFQ, or purchase directly from the supplier 1140. If unfavorable terms are offered and/or for any other reason, the buyer may alternatively select a brokerage or fulfillment service to facilitate quotation request and/or purchase and accommodate the needs of the buyer. In one embodiment of the invention, a buyer, upon receiving a response to a request for quotation, provided with the option of purchasing goods or services offered by multiple suppliers by linking directly to each supplier's ordering system and accessing price and inventory data.

New system suppliers and other users may apply for membership online via the system website. New members would receive password information via e-mail to ensure that they have provided correct e-mail coordinates.

Standardization of product or service descriptions is done to avoid confusion. To this end preprogrammed menu information can be provided to classify products and services in categories broken down by functional class and subclass corresponding to the products as they are commercially known and identified. Such menus can be readily upgraded to include new and revised commercially available products and services from the manufacturers or suppliers of such products and services.

Buyers typically include buyers from original equipment manufacturers ("OEM's"), contract electronic manufacturers/contract assembly house's ("CEM's"), independent distributors/brokers, and other entities. Suppliers typically include franchised distributors and independent distributor. Since the website is published and marketed in many languages, buyers and suppliers can use it worldwide.

Figure 3:
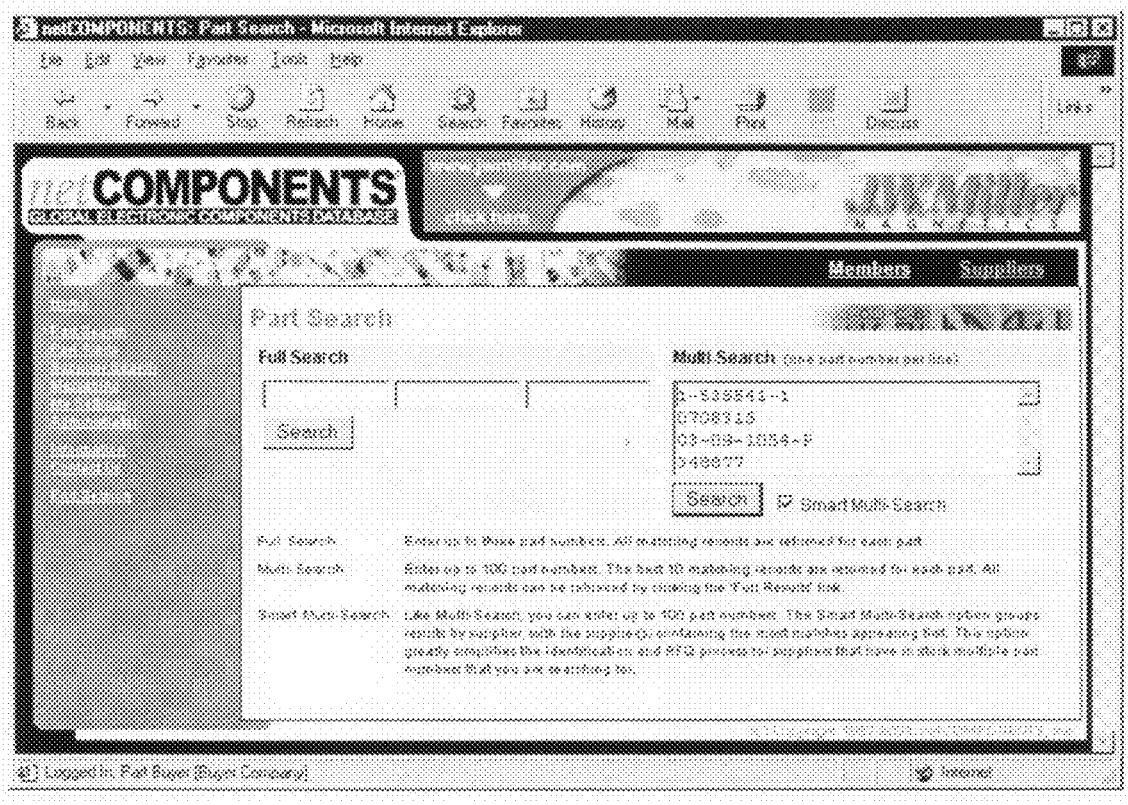
FIG. 3 is a sample website screen display of the system of the present invention depicting the multiple item query search screen.
Figure 4:
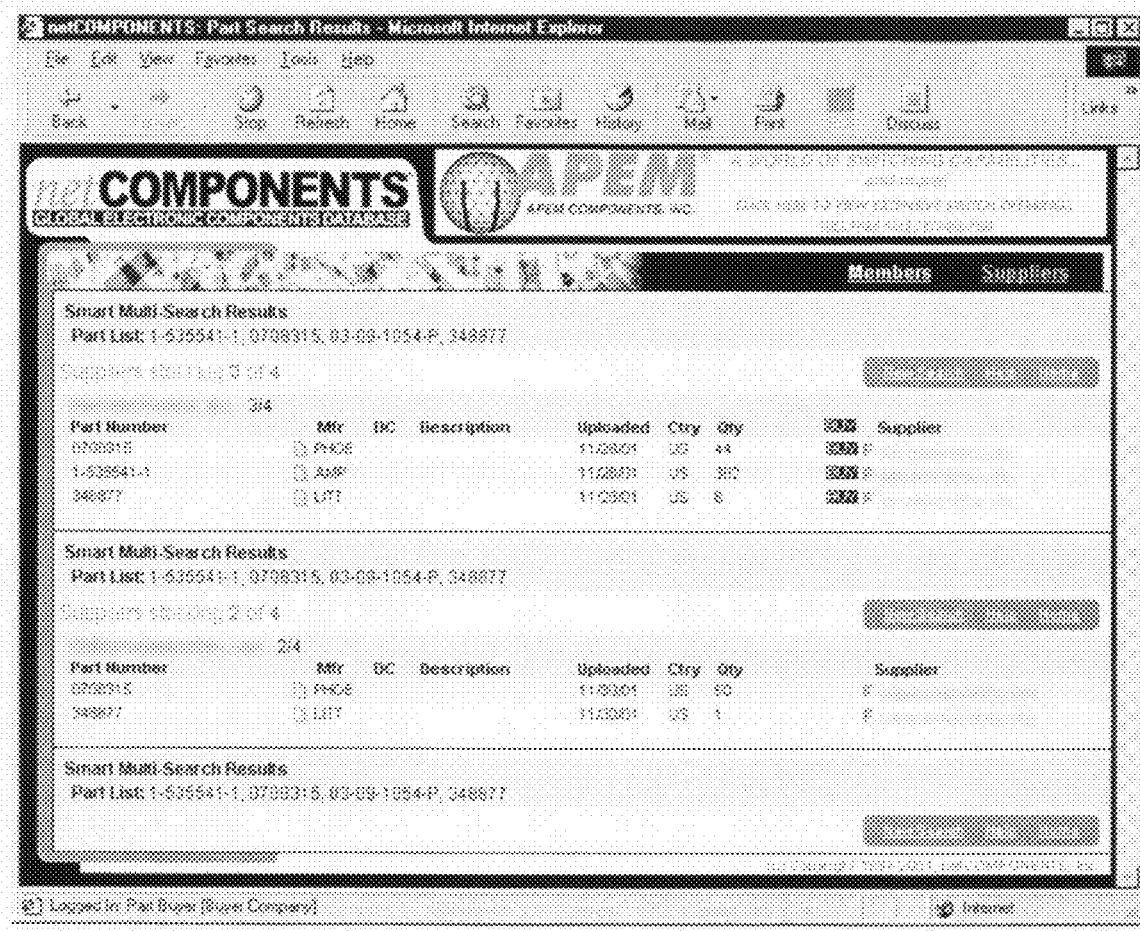
FIG. 4 is a sample website screen display of the system of the present invention depicting the multiple item query search results screen with search results ranked by suppliers who can best fill each multiple item order.

FIG. 3 depicts a sample system website screen display presenting the multiple item query search entry screen. The user can select the "smart multi-search" option and highlight displayed part numbers from a provided list, enter product/service identifier numbers manually, cut and paste part numbers, or import part numbers. Referring now to FIG. 4, which depicts a sample multiple item query search results screen, search results are provided indicating the items searched, and the corresponding results grouped and ranked by supplier based on which supplier has inventory with respect to the greatest number of queried items. If more than one supplier has similar amounts of inventory with respect to all of the queried items, the suppliers could be further ranked based on which one has the greatest quantity of inventory of each item, or other ranking criteria.

The system provides a method of searching, requesting quotations, ordering, purchasing, selling or otherwise transacting business associated with electronic components over the Internet. However, the present may equally apply to other goods or services.

According to some of the more detailed features of the invention, different options and sets of options can be associated with different classifications of buyers and/or sellers. Furthermore, the system can provide different levels of information as options and sets of options to different classifications of buyers.

While the present invention has been shown and described herein in what is considered to be a preferred embodiment there of, illustrating the results and advantages over the prior art obtained through in the present invention, the invention is not limited to the specific embodiments described above. Thus, the forms of the invention shown and described herein are to be taken as illustrative and other embodiments may be selected without departing from the spirit and scope of the present invention.

Having thus described the invention, what is claimed is:

1. A method for buyers and suppliers of products/services to engage in commerce, comprising the steps of:
    providing access to a searchable electronic database containing product/service inventory and price information for multiple different types of products/services offered by two or more suppliers to search for desired items;
    receiving via electronic communication in a single query search queries for multiple different types and quantities of products/services;
    providing search results for multiple different types and quantities of products/services in response to said query, said search results being grouped and ranked by supplier based on which supplier has inventory for the greatest number of said queried types and quantities of said multiple different types of products/services.

2. The method of claim 1, wherein said ranked search results indicate the types and quantities of said multiple different products/services contained in the inventory of each of said two or more suppliers.

3. The method of claim 1, further comprising the steps of:
    receiving from buyers requests for quotation for products/services directed to one or more of said suppliers listed in said search results;
    sending said requests for quotation to said selected one or more suppliers; and
    sending to buyers supplier quotations submitted in response to said requests for quotation.

4. A method for buyers and suppliers of products/services to engage in electronic commerce, comprising the steps of:
    providing access to a computer-based searchable supplier and products/services information database to search for desired items;
    receiving in a single query search queries for multiple products/services;
    providing in response to said single search query search results for said multiple different types and quantities of products/services, said search results being grouped and ranked by supplier based on which supplier has inventory for the greatest number and types of said queried products/services;
    receiving from buyers requests for quotation for said products/services directed to one or more of said suppliers listed in said search results;
    sending said requests for quotation to said one or more selected suppliers; and
    receiving from said one or more selected suppliers quotations submitted in response to said buyer requests for quotation.

5. The method of claim 4, wherein said ranked search results indicate the types and quantities of said multiple different products/services contained in the inventory of each of said two or more ranked suppliers.

* * * * *